(12) United States Patent
Jian et al.

(10) Patent No.: US 9,005,837 B2
(45) Date of Patent: Apr. 14, 2015

(54) GASKET FOR FUEL CELL SYSTEM MANIFOLD SEAL

(71) Applicant: FuelCell Energy, Inc., Danbury, CT (US)

(72) Inventors: Tom X. Jian, Southbury, CT (US);
Chao-Yi Yuh, New Milford, CT (US);
Ling Chen, Woodbury, CT (US);
Daniela Nedu, New Fairfield, CT (US)

(73) Assignee: Fuelcell Energy, Inc., Danbury, CT (US)

( * ) Notice: Subject to any disclaimer, the term of this patent is extended or adjusted under 35 U.S.C. 154(b) by 0 days.

(21) Appl. No.: 13/961,438

(22) Filed: Aug. 7, 2013

(65) Prior Publication Data

US 2014/0038081 A1    Feb. 6, 2014

Related U.S. Application Data

(63) Continuation-in-part of application No. 12/608,175, filed on Oct. 29, 2009, now Pat. No. 8,541,144, and a continuation-in-part of application No. 13/932,644, filed on Jul. 1, 2013, now Pat. No. 8,871,404.

(51) Int. Cl.
| | |
|---|---|
| H01M 2/38 | (2006.01) |
| H01M 8/02 | (2006.01) |
| H01M 8/24 | (2006.01) |
| H01M 8/04 | (2006.01) |
| H01M 8/14 | (2006.01) |

(52) U.S. Cl.
CPC .......... *H01M 8/0282* (2013.01); *H01M 8/2485* (2013.01); *H01M 8/04201* (2013.01); *Y02E 60/50* (2013.01); *Y02E 60/526* (2013.01); *H01M 2008/147* (2013.01)

(58) Field of Classification Search
USPC .................................. 429/458, 468, 508, 509
See application file for complete search history.

(56) References Cited

U.S. PATENT DOCUMENTS

| | | | |
|---|---|---|---|
| 4,337,571 | A | 7/1982 | Grevstad et al. |
| 4,467,018 | A | 8/1984 | Schroll |
| 4,849,308 | A | 7/1989 | Schmitten et al. |
| 5,110,692 | A | 5/1992 | Farooque et al. |
| 5,478,663 | A | 12/1995 | Cipollini et al. |
| 6,887,611 | B2 | 5/2005 | Cramer et al. |
| 6,964,825 | B2 | 11/2005 | Farooque et al. |

(Continued)

FOREIGN PATENT DOCUMENTS

JP     2009238427 A    10/2009

OTHER PUBLICATIONS

International Search Report issued in PCT Application No. PCT/US2010/053505 dated Dec. 22, 2010.

(Continued)

*Primary Examiner* — Jane Rhee
(74) *Attorney, Agent, or Firm* — MKG, LLC

(57) ABSTRACT

A gasket for a manifold seal for a fuel cell system includes a first layer of fibrous ceramic material having a first compressibility, a second layer of fibrous ceramic material having a second compressibility and a third layer of fibrous ceramic material having third compressibility. The third layer of fibrous ceramic material is positioned between and engaged with the first layer of fibrous ceramic material and the second layer of fibrous ceramic material. The third compressibility is less than the first compressibility and less than the second compressibility.

21 Claims, 14 Drawing Sheets

(56) References Cited

U.S. PATENT DOCUMENTS

| | | |
|---|---|---|
| 7,276,304 B2 | 10/2007 | Kelley et al. |
| 7,294,427 B2 * | 11/2007 | Kelley et al. .................. 429/460 |
| 8,088,697 B2 | 1/2012 | Yuh et al. |
| 2003/0124409 A1 | 7/2003 | Cramer et al. |
| 2007/0141437 A1 | 6/2007 | Siciliano et al. |

OTHER PUBLICATIONS

Office Action issued in corresponding U.S. Appl. No. 12/608,175 dated Mar. 28, 2013.

* cited by examiner

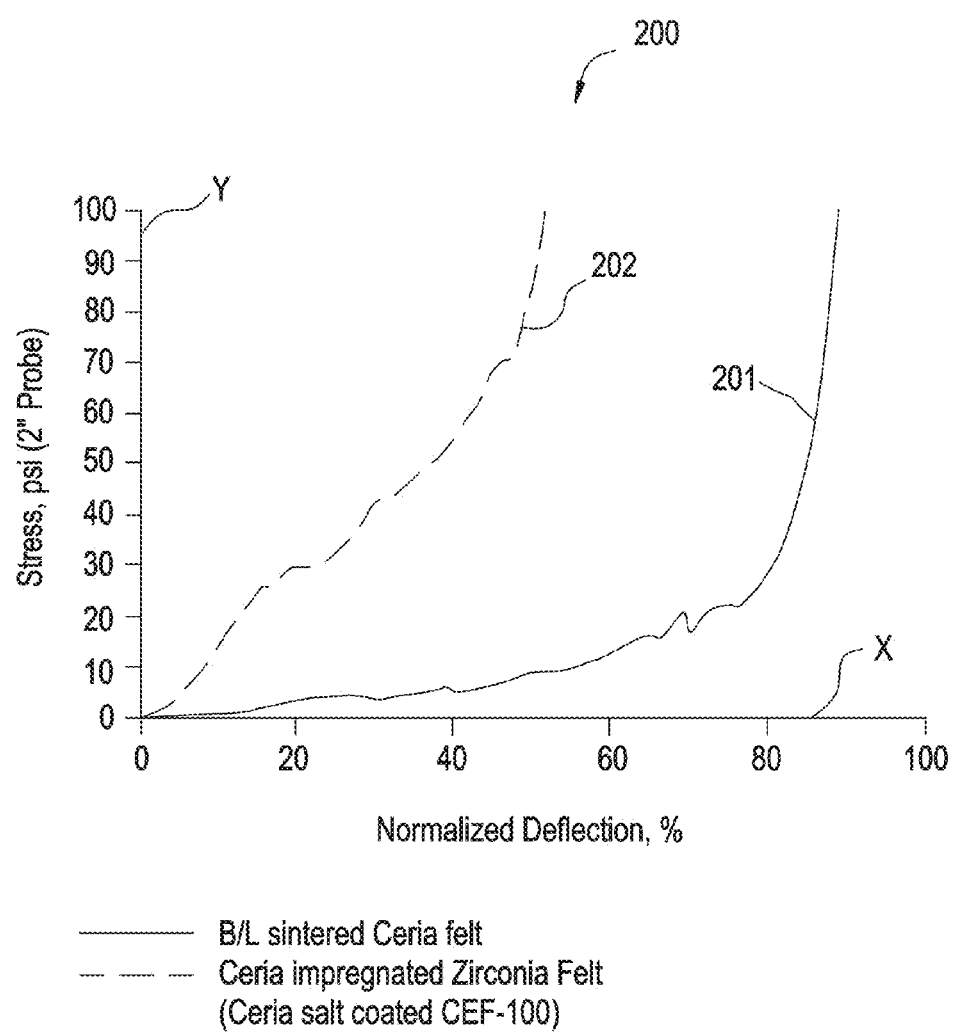

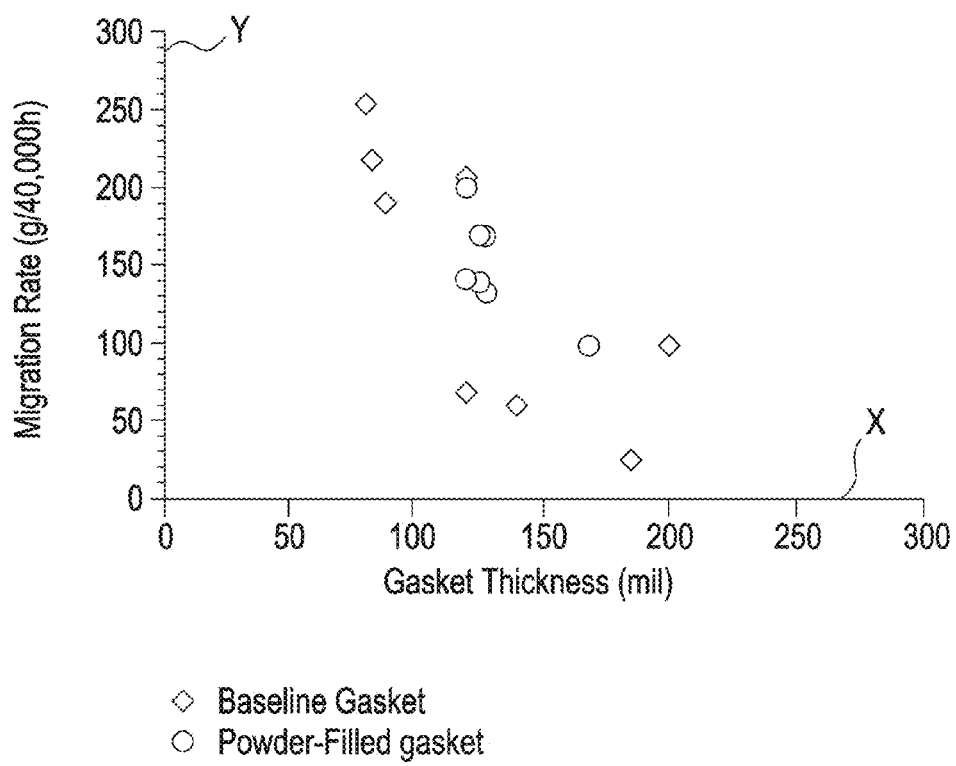

GASKET FOR FUEL CELL SYSTEM MANIFOLD SEAL

CROSS REFERENCE TO RELATED APPLICATIONS

This application is a continuation in part of U.S. patent application Ser. No. 12/608,175 entitled "Fuel Cell System Manifold Seal," filed Oct. 29, 2009, which issued as U.S. Pat. No. 8,541,144 on Sep. 24, 2013, and of U.S. patent application Ser. No. 13/932,644 "Fuel Cell System Manifold Seal," filed Jul. 1, 2013, which issued as U.S. Pat. No. 8,871,404 on Oct. 28, 2014, which is a continuation of U.S. patent application Ser. No. 12/608,175, both of which are incorporated herein by reference in their entirety.

FIELD OF THE INVENTION

The present invention generally relates to a seal for use in a fuel cell system manifold and more specifically relates to composite gasket for sealing the manifold to the fuel cell system.

BACKGROUND OF THE INVENTION

A fuel cell is a device which uses an electrochemical reaction to convert chemical energy stored in a fuel such as hydrogen or methane into electrical energy. In general, fuel cells include an anode to catalytically react with the fuel and a cathode in fluid communication with an oxidant such as air.

Fuel cells are typically arranged in a stacked relationship. A fuel cell stack includes many individual cells positioned between a fixed end plate and a free end plate. One fuel cell stack configuration includes an externally manifolded stack, wherein the fuel cell stack is left open on its sides and a fluid such as a fuel or oxidant is delivered by way of manifolds sealed to peripheral portions of respective sides of the fuel cell stack. The manifolds thus provide sealed passages for delivering the fuel and the oxidant gases to the fuel cells and directing the flow of such gases in the stack, thereby preventing those gases from leaking either to the environment or to the other manifolds. Such manifolds are typically used in Molten Carbonate Fuel Cells (MCFC) which operate at approximately 650° C. During operation of MCFCs, the fuel cells can move relative to the end plates.

Conventional fuel cells typically include an anode and a cathode separated by an electrolyte contained in an electrolyte matrix. The anode, the cathode, the electrolyte and the electrolyte matrix are disposed between a first collector and a second collector, with the first collector adjacent to the anode and the second collector adjacent to the cathode. Fuel flows to the anode via the first collector and an oxidant flows to the cathode via the second collector. The fuel cell oxidizes the fuel in an electrochemical reaction which releases a flow of electrons between the anode and cathode, thereby converting chemical energy into electrical energy.

The fuel cells described above can be stacked in series with separator plates disposed between adjacent fuel cells and end plates (e.g., a fixed end plate and a free end plate) disposed on opposing ends of the fuel cell stack. Fuel cells are stacked to increase the electrical energy they produce. Fuel cell stacks have a negative side with a negative end cell and a positive side with a positive end cell.

Ceramic materials such as sheets and fabrics comprised of ceria ($CeO_2$), zirconia ($ZrO_2$) and alumina ($Al_2O_3$) have been used in high temperature sealing and refractory applications. In particular, such ceramic materials have been used to manufacture conventional gaskets for wet and/or dry sealing of various high temperature fluids. However, such conventional gaskets are pliable and tend to sag when handled or otherwise manipulated during an assembly process. In addition, conventional gaskets have relatively low compressive strength. For example, conventional gaskets can irreversibly crush and achieve a strain of almost 0.9 in/in, when subject to a relatively low compressive load, thereby degrading the gaskets' sealing performance.

Gaskets made from ceramic materials have also been used in various fuel cell applications. A problem sometimes experienced by liquid phase fuel cells such as MCFCs is electrolyte migration which is characterized by the loss of the electrolyte from the positive end cell and the gain of electrolyte by the negative end cell. Electrolyte migration is caused by an electric voltage gradient along the length of the stack and generated by the cells in the MCFC stack. Loss of the electrolyte from the positive end cells can cause gas pockets in the electrolyte matrix of the positive end cell. This results in an irreversible increase in internal electrical resistance causing a significant voltage drop across the positive end cell and therefore decreasing the useful life of the MCFC stack. Migration of the electrolyte towards the negative end cell can also cause the negative end cell to become flooded with electrolyte, thereby reducing MCFC stack performance and life.

Electrolyte migration can occur because the electrolyte is a molten liquid when the MCFC is at its operating temperature, for example, as discussed in U.S. Pat. Nos. 8,088,697 and 7,294,427. Thus during operation, when the electrolyte is liquid, the electrolyte can flow along an outer surface of the MCFC stack. In particular, the electrolyte can flow in and/or under a gasket disposed between the outer surface and a manifold used to channel fluid such as fuel and air to the fuel cell. Problems with conventional ceramic gaskets (e.g., felts of zirconia, alumina and ceria) used for liquid phase fuel cells include: absorbing high amounts of electrolyte, acting as a conduit for electrolyte movement and having low strength. The low strength of these materials makes them difficult to handle and install in fuel cells. Ceramic gaskets such as those consisting of ZYF100 zirconia felt manufactured and as received from by Zircar Zirconia, Inc. of Florida, N.Y. have been used as a material for MCFC gaskets. However, such gaskets typically cause performance problems associated with electrolyte migration and have poor mechanical properties (e.g., low compressive strength and significant sag).

Attempts have also been made to identify ceramic gasket materials with reduced electrolyte absorption to reduce electrolyte migration in MCFCs. However, the conventional zirconia and alumina gasket materials have high electrolyte absorption and undesirable migration rates. Furthermore, alumina is shown to be unstable and reacts with molten alkali carbonate electrolyte to form wettable $LiAlO_2$.

SUMMARY OF THE INVENTION

The present invention resides, in one aspect, in a gasket for a manifold seal for a fuel cell system. The gasket includes a first layer of fibrous ceramic material having a first compressibility, a second layer of fibrous ceramic material having a second compressibility and a third layer of fibrous ceramic material having third compressibility. The third layer of fibrous ceramic material is positioned between and engaged with the first layer of fibrous ceramic material and the second layer of fibrous ceramic material. The third compressibility is less than the first compressibility and less than the second compressibility.

In one embodiment, the third layer includes one or more sintered materials.

In one embodiment, the third layer includes a plurality of entangled fibers and a reinforcing structure joined to and extending between the plurality of entangled fibers. The reinforcing structure is formed from ceramic powder sintered together with the plurality of entangled fibers.

In one embodiment, the first layer and/or the second layer is a composite including two or more sublayers.

In one embodiment, the third layer is a composite including two or more sublayers.

The gasket has utility, for example, in fuel cell systems such as MCFCs for sealing a manifold to the fuel cell system to prevent leakage or gas through the gasket. The gasket also has mechanical properties sufficient to maintain a predetermined thickness, wettability of the gasket to prevent electrolyte migration, to maintain electrical isolation and to compensate for long term dimensional changes over the life of the fuel cell.

DESCRIPTION OF THE DRAWINGS

FIG. 9 is a graph of compressive stress versus normalized deflection for the gasket material of the present invention (ceria impregnated zirconia felt) and for a baseline gasket.

FIG. 11 is a graph of electrolyte migration rates determined in accelerated laboratory tests for the gasket materials of the present invention (ceria powder impregnated ceria felt) and for a baseline gasket at various thicknesses.

DETAILED DESCRIPTION OF THE PREFERRED EMBODIMENTS

Figure 1:
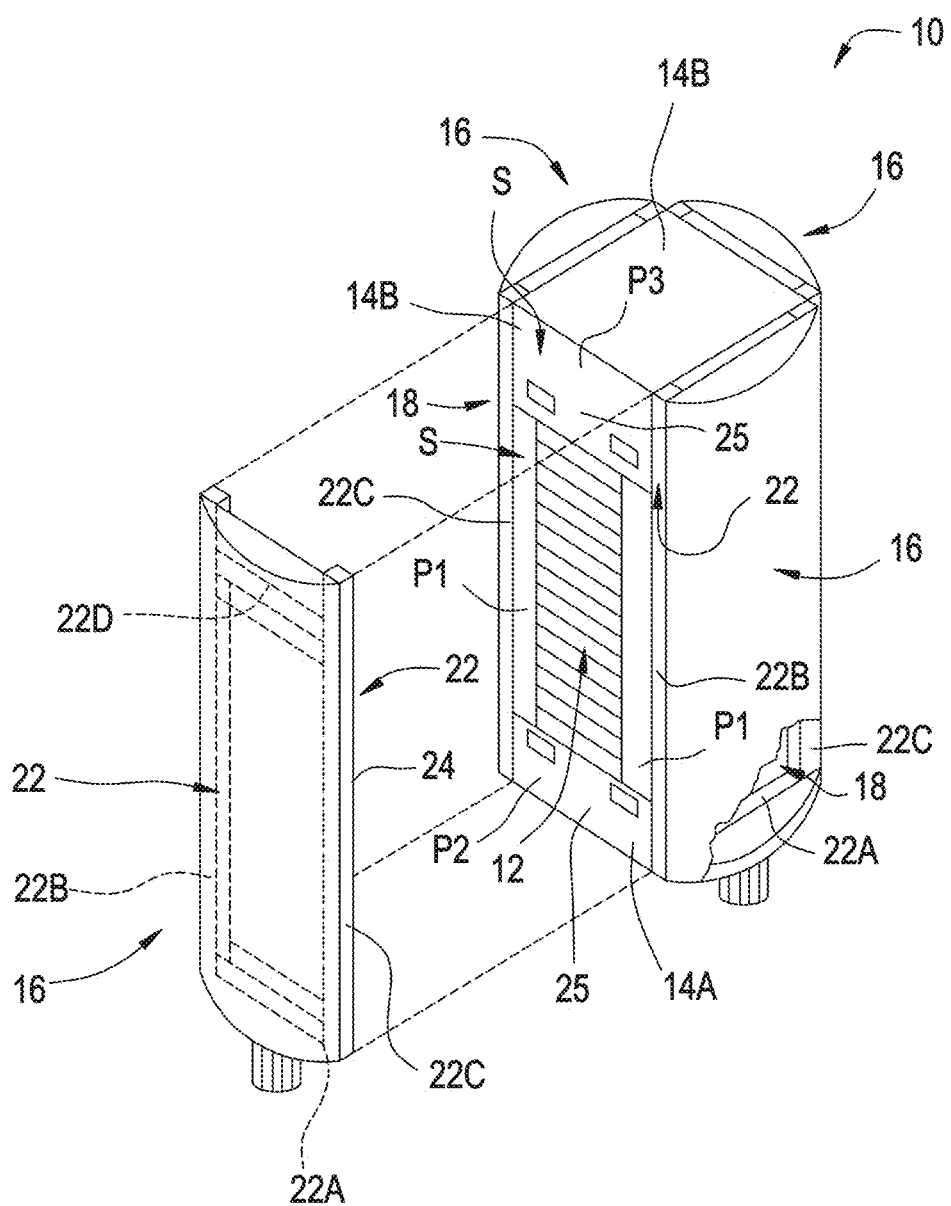
FIG. 1 is a perspective view of a fuel cell system with three manifolds secured thereto and one manifold disassembled therefrom.

Referring to FIG. 1 a fuel cell system, generally designated by the numeral 10 includes a Molten Carbonate Fuel Cell (MCFC) stack 12 positioned between opposing end plates 14A and 14B. A manifold 16 is shown positioned on three of four outwardly facing surfaces 18 of the fuel cell system 10 for directing a fluid such as fuel or an oxidant into or out of the fuel cell stack. One of the manifolds 16 is shown removed from the outwardly facing surface 18 to illustrate the stack 12 and outward facing surface 18. When assembled all four manifolds 16 are positioned on one of the respective outwardly facing surfaces 18. A generally rectangular sealing area S extends around a peripheral portion of each of the outwardly facing surfaces 18. The sealing area S is defined by a peripheral area P1 of the fuel cell stack and portions P2 and P3 of the endplates 14A and 14B, respectively. Each of the manifolds 16 has a portion thereof secured to a portion of the portion P2 of the end plate 14A. During operation of the fuel cell system 10, each of the manifolds 16 is moveable relative to the portions P1 and P3 of the respective sealing area S, for example, parallel to axes X, Y and/or Z.

While the fuel cell system 10 is described as having four outwardly facing surfaces 18 each having a generally rectangular sealing area S, the present invention is not limited in this regard, as a gasket 48 as described below can be used on fuel cell systems having any number of faces and/or sealing areas of any shape. While the fuel cell system 10 is described as including a MCFC stack, the present invention can be employed on fuel cell systems having other fuel cell stacks.

Figure 2:
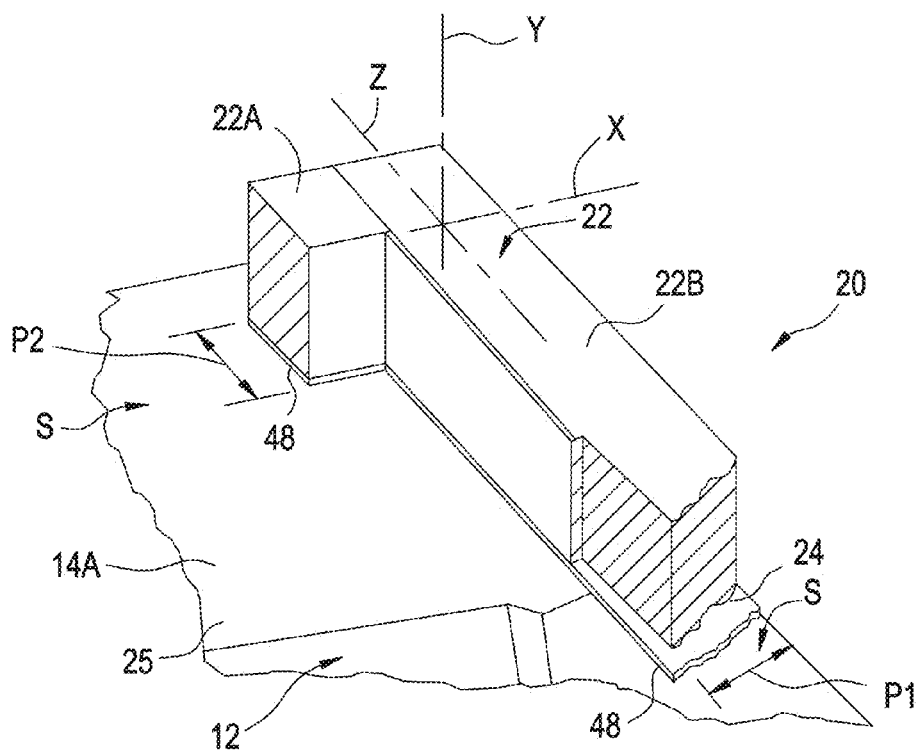
FIG. 2 is a perspective view of a portion of a fuel cell manifold seal with a portion of a manifold frame showing a composite gasket installed therein.

Referring to FIG. 2, each of the manifolds 16 includes a manifold seal, generally designated by the numeral 20. Referring to FIGS. 1 and 2, each manifold seal 20 includes a manifold frame 22 defining a mating surface 24. The mating surface 24 sealingly engages the sealing area S.

The manifold frame 22 is manufactured from four sections 22A, 22B, 22C and 22D of a dielectric material to prevent electrical short circuiting between individual cells of the fuel cell stack 12. One section 22A of each of the manifold frames 22 is secured to the outwardly facing surface 25 of the end plate 14A to restrain movement of the section 22A in a direction along the Z axis. The end plate 14A is fixed to a support structure (not shown). The manifold seal 20 also includes a gasket 48 formed into a shape complementary to the manifold frame 22 and disposed between the mating surface 24 and the sealing area S.

While the manifold frame 22 is described as being manufactured from four sections of a dielectric material, the present invention is not limited in this regard as other materials can also be employed and the manifold frame and/or sections 22A, 22B, 22C and 22D can be manufactured in any number of sections without departing from the broader aspects of the present invention.

Figure 3A:
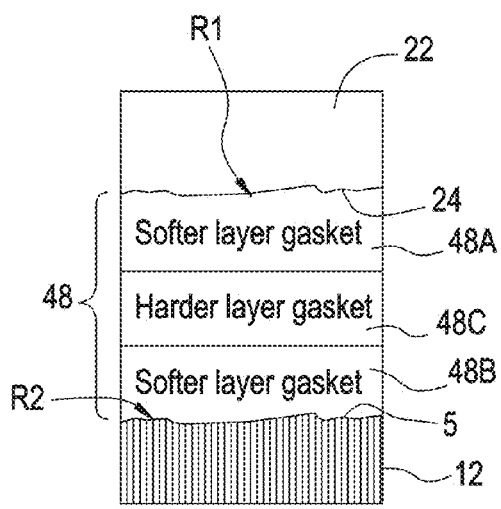
FIG. 3A is cross sectional schematic view of the composite gasket of FIG. 2 shown in an as manufactured state.
Figure 6A:
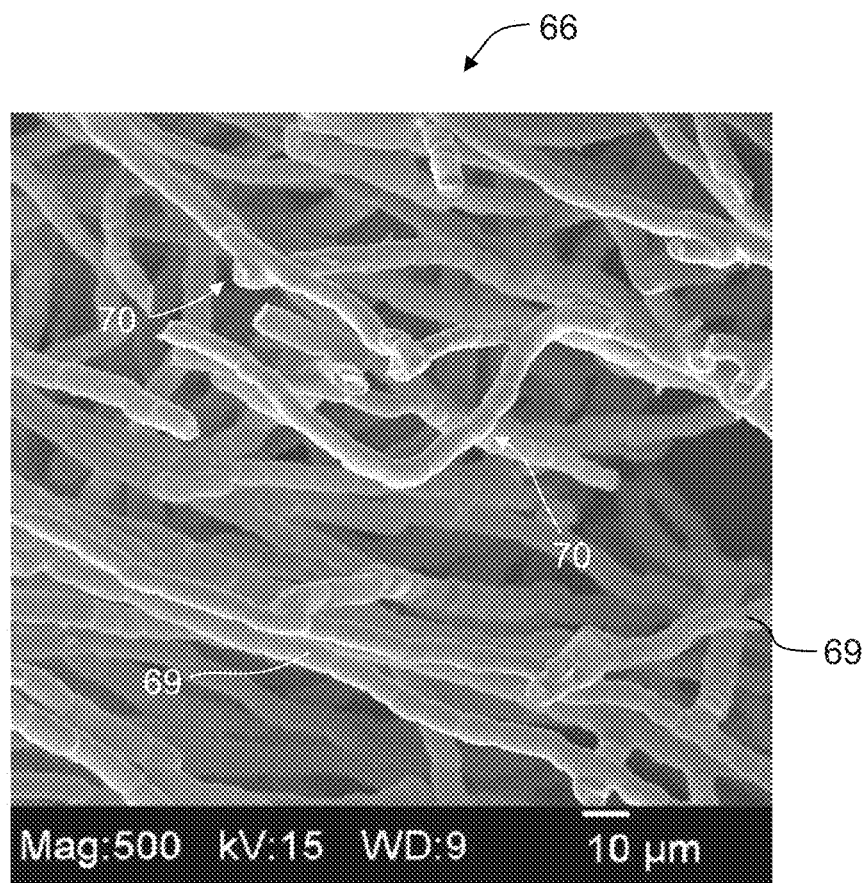
FIG. 6A is a Scanning Electron Microscope (SEM) photomicrograph at 500× magnification of a portion of a fibrous ceramic material of ceria felt.

Referring to FIG. 3A, the gasket 48 includes a first layer 48A of first fibrous ceramic material having a first compressibility; a second layer 48B of second fibrous ceramic material having a second compressibility; and a third layer 48C of third fibrous ceramic material having third compressibility. In one embodiment, the first, second and/or third ceramic material is a ceria felt 66 which has a structure of plurality of entangled fibers 69, as illustrated in FIG. 6A. The entangled fibers 69 connect to one another at junctions or connectors 70, as shown in FIG. 6A. The connectors 70 are formed as a result of heat treating a precursor material (e.g. a ceria felt). The entire third layer of fibrous ceramic material 48C illustrated in FIG. 3A is a ceria felt and in one embodiment, the entire third layer of fibrous ceramic material 48C has the third compressibility. In one embodiment, the entangled fibers 69 of the of first fibrous ceramic material of the first layer 48 and the second fibrous ceramic material of the second layer 48B have a grain size of at least 5 µm (micrometers) to form a generally smooth outer surface thereby reducing wettability and liquid absorption compared to a finer grain structure. In MCFCs a gasket having a smooth outer surface was found to reduce wettability and electrolyte absorption.

Figure 3B:
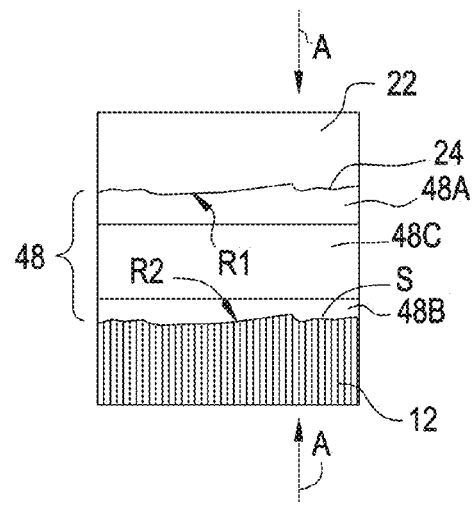
FIG. 3B is cross sectional schematic view of the composite gasket of FIG. 2 shown in a compressed state.

Referring to FIG. 3A, the third layer 48C is positioned between and engaged with the first layer 48A and the second layer 48B. The entire third layer 48C illustrated in FIG. 3A is harder than the first layer 48A and the second layer 48B such that the entire third layer of fibrous ceramic material 48C has the third compressibility that is less than the first compressibility and less than the second compressibility. In one embodiment, the first compressibility is sufficient to conform to surface irregularities R1 in the sealing area S as shown in FIG. 3B. In one embodiment, the second compressibility is sufficient to conform to surface irregularities R2 in the mating surface 24 of the manifold. As used herein, the term compressibility means the deformation of a material as a result of a compressive stress applied thereto. Thus, a material with a high compressibility is generally softer and easier to compress than a material with a lower compressibility.

Figure 4:
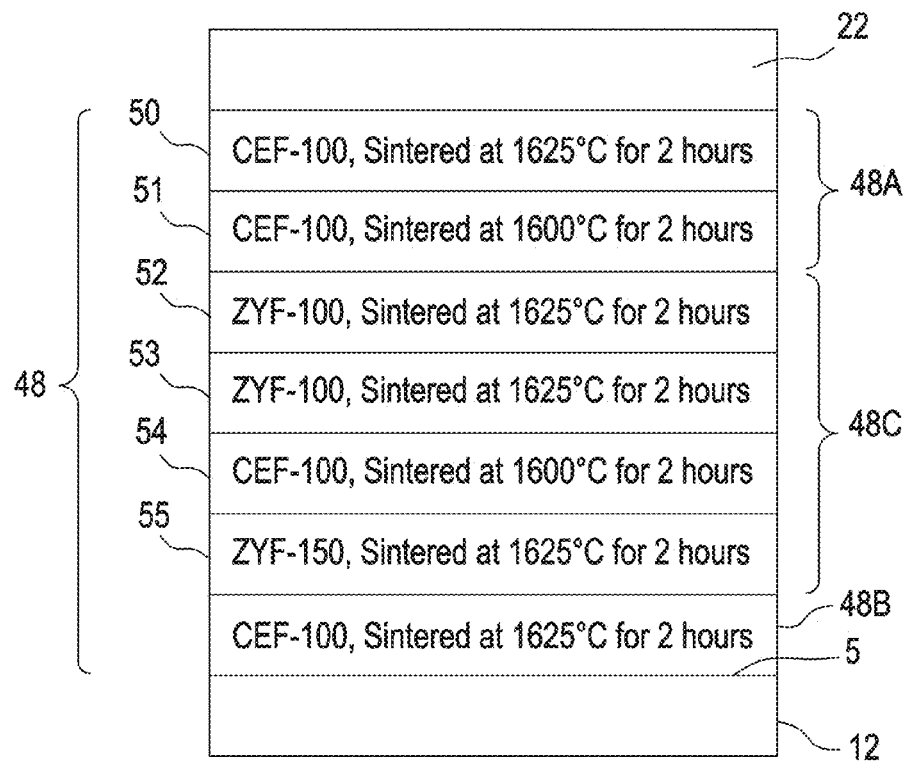
FIG. 4 is cross sectional schematic view of another embodiment of the composite gasket of FIG. 2.

As illustrated in FIG. 4, in one embodiment, the third layer 48C is formed of a different composition than that of the first layer 48A and/or the second layer 48C. For example, the third fibrous ceramic material of the third layer 48C is manufactured from a material with higher mechanical properties than that of the first fibrous ceramic material of the first layer 48A and/or second fibrous ceramic material of the second layer 48B. In one embodiment, the first fibrous ceramic material of the first layer 48A is formed from CEF-100 ceria felt (CEF-100) available from Zircar Zironia, Inc. of Florida, N.Y. In one embodiment, second fibrous ceramic material of the second layer 48B is formed from CEF-100. In one embodiment, the third fibrous ceramic material of the third layer 48C is formed from ZYF-100 zirconia felt (ZYF-100), CEF-100 ceria felt and/or ZYF-150 zirconia felt (ZYF-150) available from Zircar Zironia, Inc. of Florida, N.Y.

As illustrated in FIG. 4, the first fibrous ceramic material of the first layer 48A, the second fibrous ceramic material of the second layer 48 and/or the third fibrous ceramic material of the third layer 48C are sintered to obtain predetermined mechanical properties. For example, in one embodiment the CEF-100 is sintered at 1625° C. for 1 to 3 hours, preferably for 2 hours. For example, in one embodiment the CEF-100 is sintered at 1600° C. for 1 to 3 hours, preferably for 2 hours. For example, in one embodiment the ZYF-100 is sintered at 1625° C. for 1 to 3 hours, preferably for 2 hours. For example, in one embodiment the ZYF-150 is sintered at 1625 for 1 to 3 hours, preferably 2 hours. For example, in one embodiment the ZYF-100 is sintered at 1600° C. for 1 to 3 hours, preferably for 2 hours.

While the mechanical properties of the third fibrous ceramic material of the third layer 48C are described as being established by material selection and sintering, the present invention is not limited in this regard as the mechanical properties of the third fibrous ceramic material of the third layer 48C can be established by selection of materials with a higher density, selection of precursor fibers and altering the production process.

As shown in FIG. 4, in one embodiment, the first layer 48A is a composite having two first sublayers 50 and 51. In one embodiment, the third layer 48C includes four sublayers 52, 53, 54 and 55. While the first layer 48A is described as having the two sublayers 50 and 51 and the third layer 48C is described as having the four sublayers 52, 53, 54 and 55, the present invention is not limited in this regard as the first layer 48A, the second layer 48B and the third layer 48C may have any number of sublayers.

Figure 5:
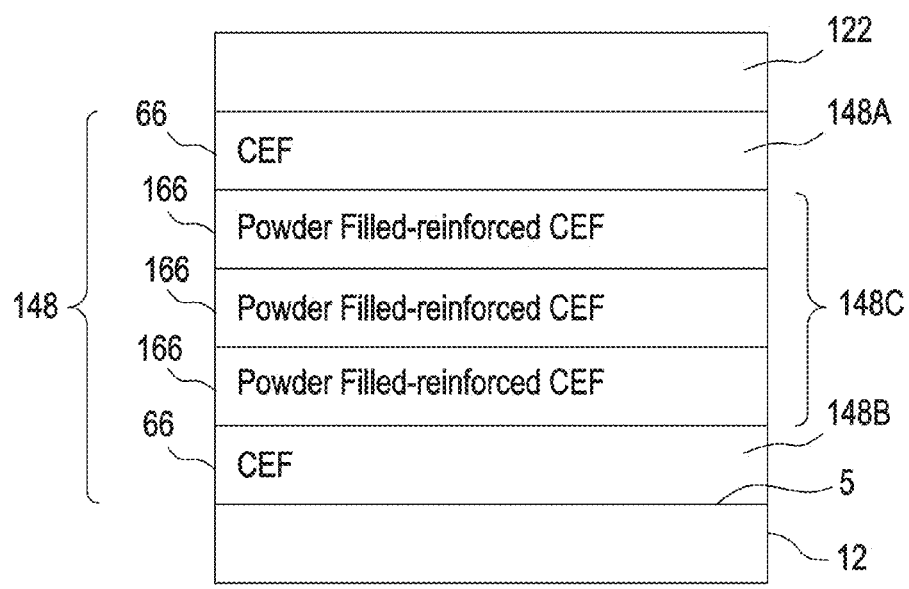
FIG. 5 is a cross sectional schematic view of another embodiment of the composite gasket of FIG. 2.
Figure 6B:
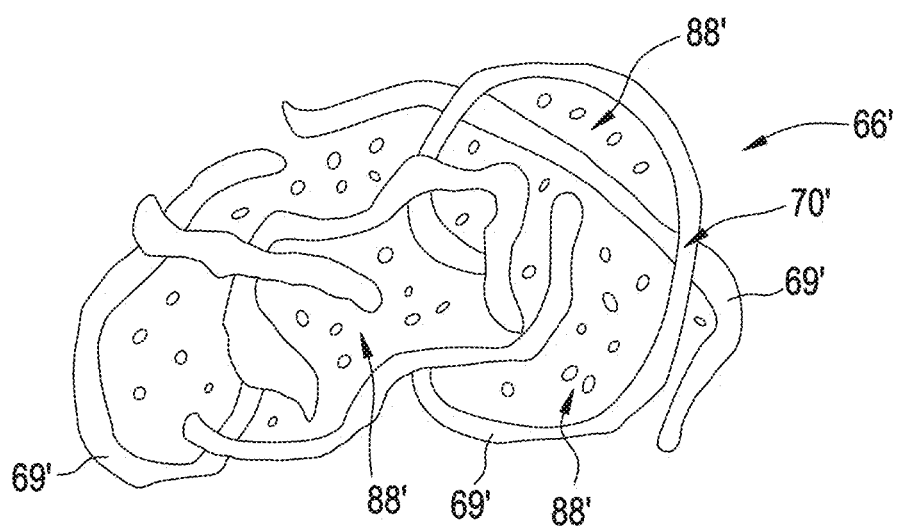
FIG. 6B is a schematic drawing of a fibrous ceramic material of ceria felt with a ceramic powder dispersed therein.
Figure 6C:
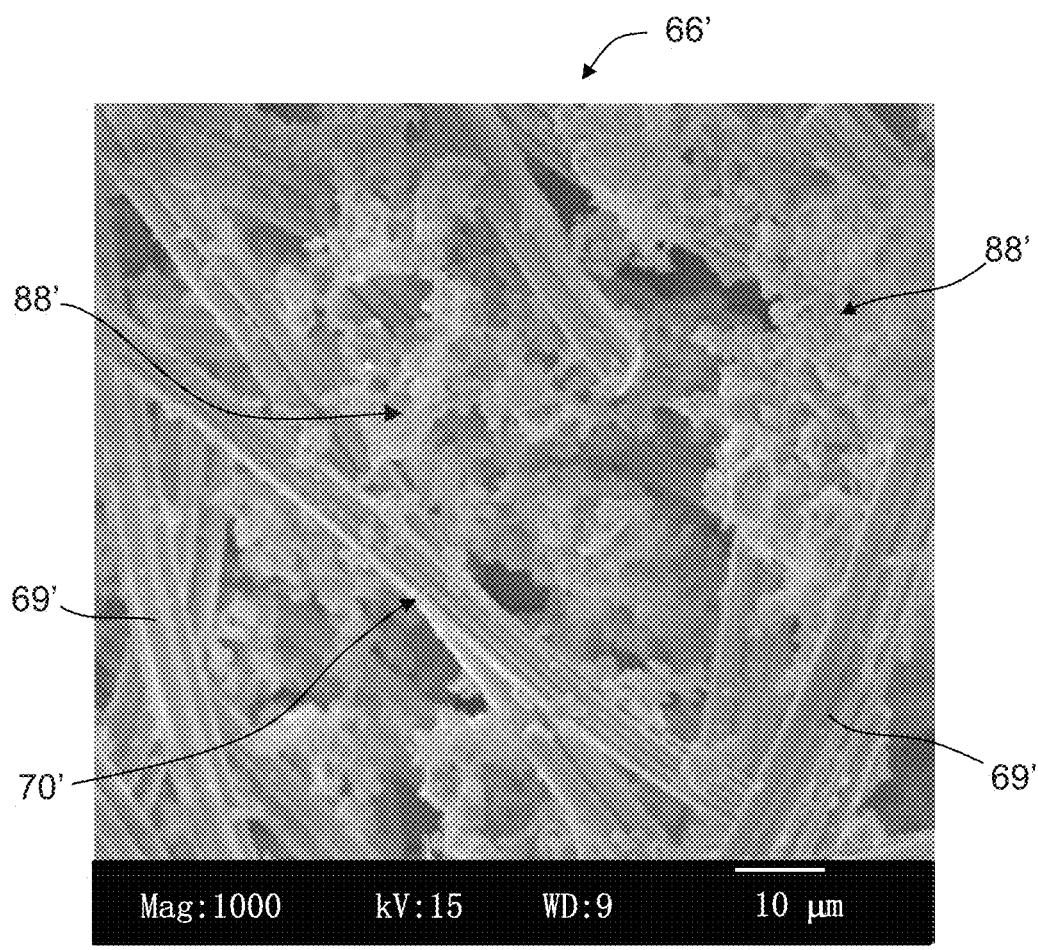
FIG. 6C is Scanning Electron Microscope (SEM) photomicrograph at 1000× magnification of a portion of ceria felt with a ceramic powder dispersed therein.
Figure 7:
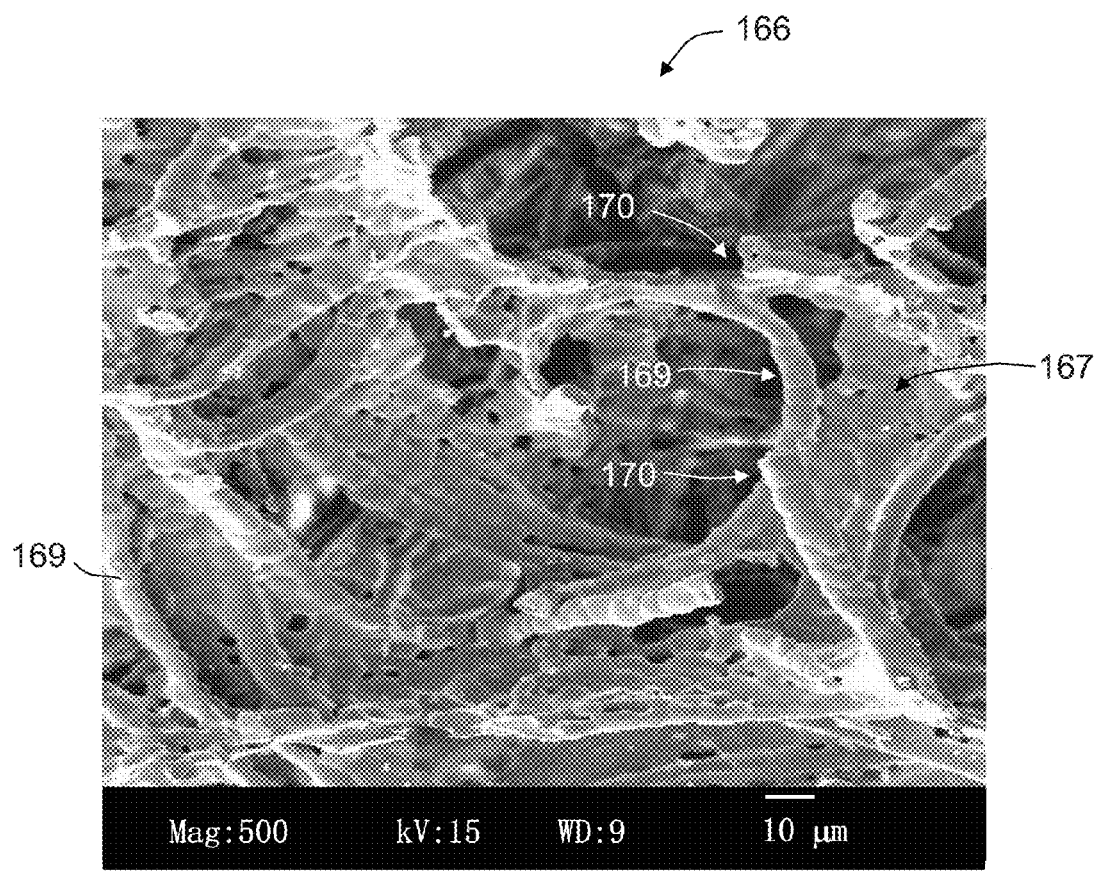
FIG. 7 is a SEM photomicrograph at 500× magnification of a portion of a sintered powder filled fibrous ceramic material of ceria felt.

Referring to FIGS. 5-7, a gasket 148 is similar to the gasket 48 of FIGS. 3A, 3B and 4. Therefore, similar elements are given the same reference numbers preceded by the numeral 1. The gasket 148, includes a first layer 148A of first fibrous ceramic material having a first compressibility; a second layer 148B of second fibrous ceramic material having a second compressibility; and a third layer 148C of third fibrous ceramic material having third compressibility. The first, second and/or third ceramic material has/have a structure of plurality of entangled fibers 69, as described below and illustrated in FIG. 6A. The third layer 148C is positioned between and engaged with the first layer 148A and the second layer 148B. The third layer 148C is harder than the first layer 148A and the second layer 148B such that the third compressibility is less than the first compressibility and less than the second compressibility. In one embodiment, the first compressibility is sufficient to conform to surface irregularities R1 in the sealing area S as shown in FIG. 3B. In one embodiment, the second compressibility is sufficient to conform to surface irregularities R2 in the mating surface 24 of the manifold.

In one embodiment, the first fibrous ceramic material of the first layer 148A is CEF-100; and the second fibrous ceramic material of the second layer 148B is CEF-100. In the embodiment illustrated in FIGS. 5 and 7, the third layer 148C is manufactured from three sublayers of a sintered powder filled CEF-100 (designated by reference number 166). As illustrated in FIG. 6B, a ceramic powder 88' is dispersed in the ceria felt 66' and is integrated or dispersed between the fibers 69'. The fibers 69' connect to one another at junctions or connectors 70', as shown in FIGS. 6B and 6C. FIG. 6C is Scanning Electron Microscope (SEM) photomicrograph at 1000× magnification of a portion of ceria felt 66' with a ceramic powder 88' dispersed therein. The ceria felt 66' with the ceramic powder 88' therein is sintered together with the plurality of entangled fibers 169 to create a sintered powder filled CEF-100 (designated by reference number 166), as illustrated in FIG. 7. The entangled fibers 169 are connected to one another at junctions or connectors 170. In addition, a reinforcing structure 180, for example, a plurality of melted and solidified ceramic powder webs 167 join with and extend between the plurality of entangled fibers 169. The reinforcing structure 180 has superior mechanical properties (e.g., lower compressibility and higher hardness) compared to ceria felt 66 with none of the powder 88' sintered therein, as described below with reference to FIG. 8.

The inventors have discovered that impregnating ceria powders, salt, or salt solutions into the ceria, zirconia, or alumina fibrous structure and sintering the structure together into a cross-linked web structure, greatly improves mechanical properties (i.e., compared to a base line sintered ceria felt) required for the fuel cell manifold sealing while maintaining acceptable electrolyte migration by maintaining sufficient gasket thickness.

The inventors have discovered that impregnating zirconia powders, salt or salt solutions into the ceria fibrous structure and sintering the structure together into a cross-linked web structure greatly improved mechanical properties (i.e., compared to a base line sintered ceria felt) required for the fuel cell manifold sealing while maintaining acceptable electrolyte migration by maintaining sufficient gasket thickness.

Figure 8:
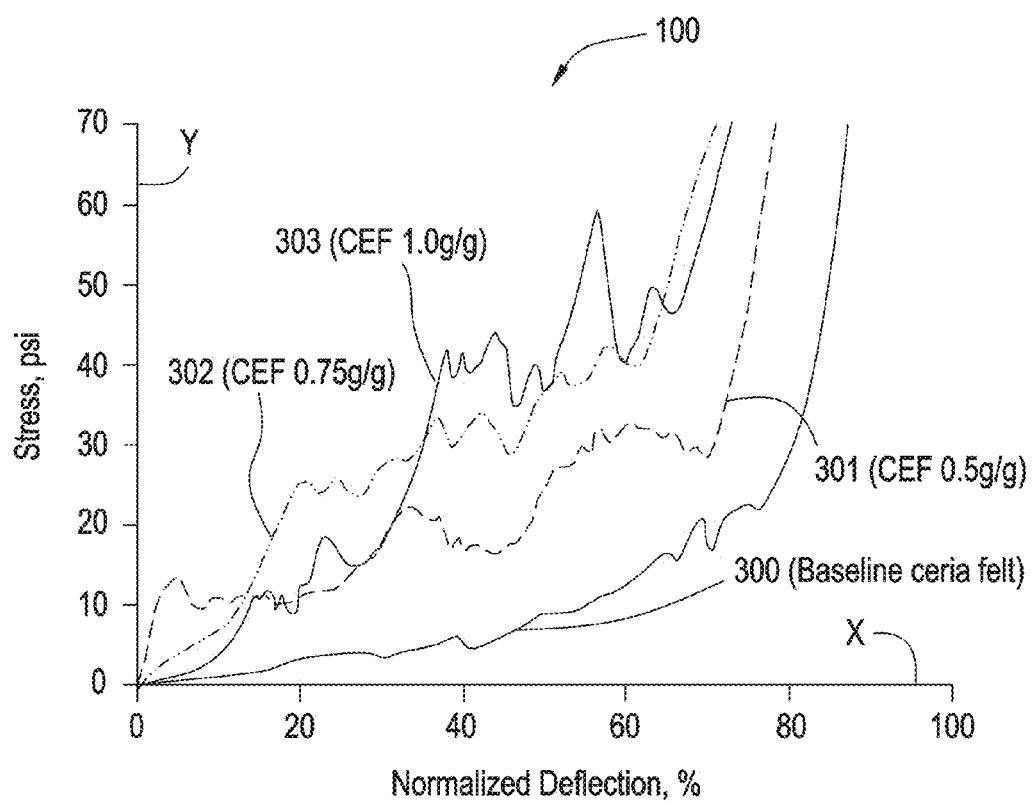
FIG. 8 is a graph of compressive stress versus normalized deflection for the gasket materials of the present invention (ceria powder impregnated ceria felt) and for a baseline gasket.

For example, referring to FIG. 8, a graph 100 has compressive stress in psi units marked on a Y axis and has normalized deflection in % marked on an X axis. The graph 100 includes four plots 300, 301, 302 and 303 of stress versus normalized deflection for four ceria felts. The plot 300 is for a baseline ceria felt 66 with no ceria powder 88' added thereto. The plot 301 is for a sintered powder filled CEF-100 having 0.5 g of ceria powder added thereto, per gram of ceria felt material prior to filling (designated by reference number 166A). The plot 302 is for a sintered powder filled CEF-100 having 0.75 g of ceria powder added thereto, per gram of ceria felt material prior to filling (designated by reference number 166B). The plot 303 is for a sintered powder filled CEF-100 having 1.0 g of ceria powder added thereto, per gram of ceria felt material prior to filling (designated by reference number 166C). As shown in FIG. 8, the inventors have discovered that adding and increasing the amount of ceramic powder 88' to the ceria felt 66' and sintering the combination thereof results in a sintered powder filled CEF-100 (designated by reference number 166A, 166B, 166C or collectively referred to as 166) that has higher compressive strength properties than that of the ceria felt 66. Table 1 below summarizes several data points taken from the plots 300, 301, 302 and 303 to illustrate the ability of the sintered powder filled CEF-100 (designated by reference number 166A, 166B, 166C or collectively referred to as 166) to withstand compression (i.e., deflection) as a result of an increase in compressive stress. The data in Table 1 also demonstrates the further ability of the sintered powder filled CEF-100 to withstand compression with increasing amounts of ceramic powder.

TABLE 1

Strength-deflection table of sintered ceria powder filled ceria felt materials.

| Material (plot number) | Compressive Stress (psi) | Normalized deflection (%) (ND) | Percent Decrease in Deflection Compared to the Baseline Plot 300 $(ND_{bl} - ND_{sinter\,powder})/ND_{bl}$ |
|---|---|---|---|
| Baseline ceria felt (300) | 10 | 55.4 | Not applicable |
| Sintered powder filled CEF-100 having 0.5 g/g of ceria powder added thereto 166A (301) | 10 | 19.4 | 65 |
| Sintered powder filled CEF-100 having 0.75 g/g of ceria powder added thereto 166B (302) | 10 | 18.2 | 67 |
| Sintered powder filled CEF-100 having 1.0 g/g of ceria powder added thereto 166C (303) | 10 | 18 | 78 |
| Baseline ceria felt (300) | 20 | 71.6 | Not applicable |
| Sintered powder filled CEF-100 having 0.5 g/g of ceria powder added thereto 166A (301) | 20 | 47.8 | 33 |
| Sintered powder filled CEF-100 having 0.75 g/g of ceria powder added thereto 166B (302) | 20 | 16.8 | 57 |
| Sintered powder filled CEF-100 having 1.0 g/g of ceria powder added thereto 166C (303) | 20 | 31 | 76.5 |
| Baseline ceria felt (300) | 30 | 80.3 | Not applicable |
| Sintered powder filled CEF-100 having 0.5 g/g of ceria powder added thereto 166A (301) | 30 | 70.4 | 12 |
| Sintered powder filled CEF-100 having 0.75 g/g of ceria powder added thereto 166B (302) | 30 | 45.6 | 43 |
| Sintered powder filled CEF-100 having 1.0 g/g of ceria powder added thereto 166C (303) | 30 | 35 | 56 |
| Baseline ceria felt (300) | 50 | 85 | Not applicable |
| Sintered powder filled CEF-100 having 0.5 g/g of ceria powder added thereto 166A (301) | 50 | 75.4 | 11 |
| Sintered powder filled CEF-100 having 0.75 g/g of ceria powder added thereto 166B (302) | 50 | 65 | 24 |
| Sintered powder filled CEF-100 having 1.0 g/g of ceria powder added thereto 166C (303) | 50 | 67.3 | 21 |

Referring to FIG. 9, a graph 200 has compressive stress in psi units marked on a Y axis and has normalized deflection in % marked on an X axis. The graph 200 includes a plot 201 of stress versus normalized deflection for a baseline sintered ceria felt. The graph 200 includes a plot 202 of stress versus normalized deflection for a ceria coated or impregnated zirconia felt 266 as described below with reference to FIGS. 10A and 10B, for example, ceria salt coated CEF-100 or a zirconia felt impregnated with 2M cerous nitrate solution, followed by heat treatment at 1600° C. for 2 hours. The data in FIG. 9 demonstrates the further ability of the ceria salt coated CEF-100 to better withstand compression as compared to the baseline sintered ceria felt in the presence of liquid carbonate electrolyte at 650° C. For example, at a stress of 50 psi the ceria impregnated (e.g., coated) zirconia felt 266 has a deflection of about 38% compared to about 85% for the baseline sintered ceria felt.

Figure 10A:
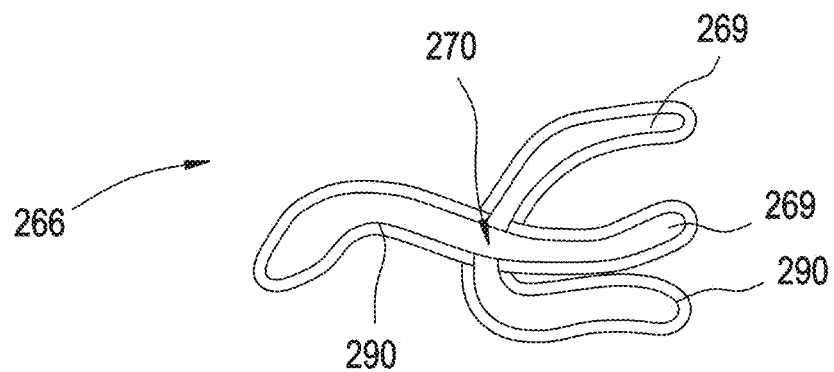
FIG. 10A is a schematic view of two fibers of a fibrous ceramic material shown with a ceria coating applied thereto.
Figure 10B:
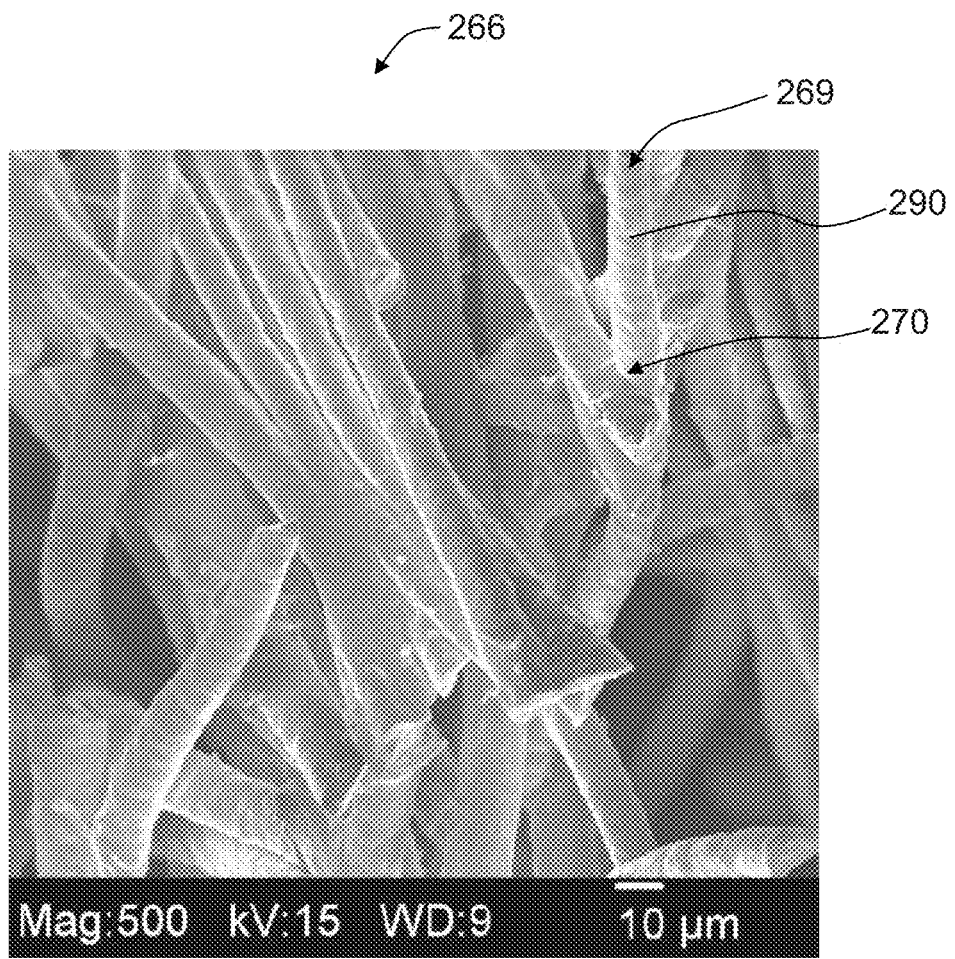
FIG. 10B is Scanning Electron Microscope (SEM) photomicrograph at 500× magnification of a portion of zirconia felt with a ceria coating applied thereto.

Referring to FIG. 10A, a ceramic fibrous material is designated by the numeral 266. The ceramic fibrous material 266 has a plurality of entangled fibers 269 connected to one another at junctions 270. The fibers 269 have a coating 290 applied thereto. The coating 290 covers the surface of the fibers 269 and is impregnated into the fibers 269. The coating 290 is for example, ceria, zirconia and/or alumina. In one embodiment the ceramic fibrous material 266 is zirconia. In one embodiment the ceramic fibrous material 266 is alumina. In one embodiment, the third ceramic material of the third layer 148C of FIG. 3A includes one or more layers of the ceramic fibrous material 266 with the coating 290 applied to the fibers 269. Application of the coating 290 to the fibers 269 decreases the compressibility of the ceramic fibrous material 266 thereby creating a harder material with improved mechanical properties compared to the ceria felt 66. FIG. 10B is Scanning Electron Microscope (SEM) photomicrograph at 500× magnification of a portion of ceramic fibrous material 266 (e.g., zirconia felt) with a ceria coating 290 applied to (e.g., coated or impregnated) the fibers 269.

During operation, the gasket 48 is compressed between the manifold 22 and the sealing area S in the direction indicated by the arrows A, as illustrated in FIG. 3B. A portion of the first layer 48A compresses into and conforms with irregularities R1 in the sealing area S for providing a gas tight seal between the sealing area S and the first layer. A portion of the second layer 48D compresses into and conforms with irregularities R2 in the mating surface 24 of the manifold 22 for providing a gas tight seal between the second layer and the mating surface 24. The third layer 48C compresses to a lesser degree than the first layer 48A and the second layer 48B to maintain the structure and thickness of the gasket 48 at a magnitude sufficient to mitigate electrolyte migration.

Table 2 below summarizes the leak rate of the gasket materials described above with reference to FIG. 8 and Table 1, to illustrate the improvement of sealability of the sintered powder filled CEF-100 (designated by reference number 166A, 166B, 166C or collectively referred to as 166). The inventors have discovered that adding and increasing the amount of ceramic powder 88' to the ceria felt 66' and sintering the combination thereof results in a sintered powder filled CEF-100 (designated by reference number 166A, 166B, 166C or collectively referred to as 166) that has improved gas leak rate properties (reduced leak rate) compared to that of a baseline sintered ceria felt 66.

TABLE 2

Gas leak rate table of sintered ceria powder filled ceria felt materials.

| Material (plot number) | Leak rate (LR) at 180 mil, R.T. | Percent Decrease in Leak Rate Compared to the Baseline Gasket 300 $(LR_{bl} - LR_{sinter\,powder})/LR_{bl}$ |
|---|---|---|
| Baseline ceria felt (300) | 72 | Not applicable |
| Sintered powder filled CEF-100 having 0.5 g/g of ceria powder added thereto 166A (301) | 50.4 | 30 |
| Sintered powder filled CEF-100 having 0.75 g/g of ceria powder added thereto 166BA (302) | 47.3 | 35 |
| Sintered powder filled CEF-100 having 1.0 g/g of ceria powder added thereto 166C (303) | 42 | 42 |

FIG. 11 is a graph 400 of electrolyte migration rate (grams/40,000 hours) on a Y axis versus gasket thickness in mils on an X axis, based upon electrolyte migration rate experimentation determined in accelerated laboratory tests for the gasket materials of the present invention (ceria powder impregnated ceria felt 266) and for a baseline sintered ceria felt gasket at various thickness. The results of the testing demonstrated similar electrolyte migration rates for the gasket materials of the present invention (ceria powder impregnated ceria felt 266) and for a baseline sintered ceria felt gasket.

Although the present invention has been disclosed and described with reference to certain embodiments thereof, it should be noted that other variations and modifications may be made, and it is intended that the following claims cover the variations and modifications within the true scope of the invention.

What is claimed is:

1. A gasket for a manifold seal for a fuel cell system, the gasket comprising:
a first layer of fibrous ceramic material having a first compressibility;
a second layer of fibrous ceramic material having a second compressibility;
a third layer of fibrous ceramic material, the entire third layer of fibrous ceramic material having a third compressibility, the third layer of fibrous ceramic material being positioned between and engaged with the first layer of fibrous ceramic material and the second layer of fibrous ceramic material; and
the third compressibility being less than the first compressibility and less than the second compressibility.

2. The gasket of claim 1, wherein the third layer has a different composition than that of the first layer and the second layer.

3. The gasket of claim 1, wherein the third layer has a higher density than that of the first layer and the second layer.

4. The gasket of claim 1, wherein the third layer comprises a different precursor than that of the first layer and the second layer.

5. The gasket of claim 1, wherein the third layer comprises at least one-sintered material.

6. The gasket of claim 1, wherein the third layer comprises a plurality of entangled fibers and a reinforcing structure joined to and extending between the plurality of entangled fibers.

7. The gasket of claim 6, wherein the reinforcing structure comprises a ceramic powder sintered together with the plurality of entangled fibers.

8. The gasket of claim 1, wherein the third layer comprises a plurality of entangled fibers, the plurality of entangled fibers having a ceria coating thereon.

9. The gasket of claim 1, wherein the third layer comprises a plurality of entangled fibers, the plurality of entangled fibers having a zirconia coating thereon.

10. The gasket of claim 1, wherein the third layer comprises a plurality of entangled fibers, the plurality of entangled fibers having a alumina coating thereon.

11. The gasket of claim 1, wherein the first compressibility and the second compressibility are sufficient to conform to surface irregularities in a mating surface.

12. The gasket of claim 1, wherein at least one of the first layer and the second layer is a composite comprising at least two first sublayers.

13. The gasket of claim 1, wherein at least one of the first layer and the second layer comprise ceria felt.

14. The gasket of claim 13, wherein the ceria felt is sintered at 1625° C.

15. The gasket of claim 13, wherein the ceria felt is sintered at 1600° C.

16. The gasket of claim 1, wherein the third layer is a composite comprising at least two second sublayers.

17. The gasket of claim 16, wherein the at least two second sublayers comprises at least one of zirconia felt and ceria felt.

18. The gasket of claim 17, wherein the at least one of zirconia felt and ceria felt is sintered at 1625° C.

19. The gasket of claim 17, wherein the at least one of zirconia felt and ceria felt is sintered at 1600° C.

20. The gasket of claim 1, wherein the first layer of fibrous ceramic material and the second layer of fibrous ceramic material have a grain size of at least 5 μm.

21. The gasket of claim 1, wherein the first layer of fibrous ceramic material and the second layer of fibrous ceramic material have a smoothness sufficient to reduce wettability and electrolyte absorption compared to layers having a grain size of less than 5 μm.

* * * * *